US007514133B2

(12) United States Patent
Moosheimer et al.

(10) Patent No.: US 7,514,133 B2
(45) Date of Patent: Apr. 7, 2009

(54) LABEL HAVING TRANSPARENT AND OPAQUE AREAS

(75) Inventors: Ulrich Moosheimer, Hohenkammer (DE); Robert Unglert, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 499 days.

(21) Appl. No.: 11/221,180

(22) Filed: Sep. 7, 2005

(65) Prior Publication Data

US 2006/0057313 A1 Mar. 16, 2006

(30) Foreign Application Priority Data

Sep. 13, 2004 (DE) ....................... 10 2004 044 171

(51) Int. Cl.
*B32B 9/00* (2006.01)
*B32B 33/00* (2006.01)

(52) U.S. Cl. .................... 428/42.2; 428/40.1; 428/34.1; 283/81; 283/101; 283/103; 283/104; 283/405

(58) Field of Classification Search ................ 428/34.1, 428/42.2, 40.1; 283/81, 101, 103–105; 40/310
See application file for complete search history.

(56) References Cited

U.S. PATENT DOCUMENTS 5,135,125 A 8/1992 Andel et al.
5,829,788 A * 11/1998 Jackson ....................... 283/81
6,193,279 B1 * 2/2001 Seidl .......................... 283/81

FOREIGN PATENT DOCUMENTS

| | | | |
|---|---|---|---|
| DE | 39 07 862 | A1 | 9/1990 |
| DE | 91 01 464 | U1 | 6/1991 |
| DE | 19642039 | | 10/1996 |
| EP | 0 356 574 | A2 | 9/1988 |
| EP | 0 463 193 | A1 | 6/1990 |
| EP | 0 632 422 | A1 | 4/1994 |
| EP | 1276089 | | 1/2003 |
| GB | 2209148 | | 5/1989 |

* cited by examiner

*Primary Examiner*—Michael C Miggins
(74) *Attorney, Agent, or Firm*—Collard & Roe, P.C.

(57) ABSTRACT

A strip-shaped label has a transparent plastic film layer partially covered by an opaque film layer. A window area not covered by the opaque film layer remains. The film layers are bonded to one another using an adhesive layer. Before attachment, the label is positioned on a carrier. A bow-shaped suspension tab is produced through punching, on whose bottom non-adhesive areas are provided, which allow a suspension tab to be pulled out of the label plane easily for suspension of the container. Two printed voucher sections are implemented in the opaque label film. The transparent film layer has an adhesive-repellent coating, which is also transparent, below the voucher sections. In the stuck-on state, the label area in which the voucher sections are positioned overlap the transparent window area. After removal of one of the voucher sections, the window area is visible and the container contents may be viewed.

7 Claims, 3 Drawing Sheets

LABEL HAVING TRANSPARENT AND OPAQUE AREAS

BACKGROUND OF THE INVENTION

1. Field of the Invention

The present invention relates to a label having transparent and opaque label areas.

2. The Prior Art

Labels of this type are used, among other times, when the fill level of a labeled transparent container is to be registered from different angles at a glance, or if other objects located below and/or behind the label, such as displays, are to be visible through the label.

The opaque and transparent areas in a label are typically implemented by providing a transparent label film with opaque, usually white background printing, with only the area of the window being left out and therefore remaining transparent. Printing over almost the entire area has the disadvantages that it is not only relatively expensive because of the high consumption of printing ink, but also that the multiple screen printing procedures which are usually necessary make the manufacturing process very complex. Leaving the label film entirely transparent usually does not represent an alternative, since a text imprint would only be readable with difficulty or practically not at all—particularly with labels that overlap themselves, having printing in the overlapped and overlapping areas. Transparent areas are typically unavoidable precisely in container labels which overlap themselves when stuck on as intended, in order to be able to check the container fill level. The dimensions of corresponding labels in the dispensing direction may be from somewhat more than one time to multiple times the container circumference. Labels of this type are frequently referred to as "overwrapping" labels.

Overwrapping labels are used above all for identifying pharmaceutical containers, such as infusion bottles, injection ampoules, tablet bottles, medication bottles, etc., since a small container size is often faced by a large amount of information which is to be attached to the container. Thus, often nearly the entire container surface is needed for typical tasks such as active ingredient identification and dosing, package size, usage instructions, batch number, and expiration date, sometimes in more than one language. If necessary, the lateral surface of a container may be used multiple times by applying overwrapping labels. For this purpose, arrangements are made which allow and/or simplify at least partial unwinding of the label from the container, so that the information which is printed on the label areas covered by the overlap is accessible. These arrangements may include grip tabs on the label edge (which trails during dispensing), which have no pressure-sensitive adhesive coating or one having reduced adhesive force on their bottom side, as well as adhesion-reducing coatings, such as a silicone treatment.

Like other labels in the medical/pharmaceutical field, overwrapping labels are often implemented so that parts of the label may be separated from the rest of the label using perforation lines or separating layers, for example. The separated areas, which are often referred to as voucher sections, may be archived separately, for example, stuck in patient files or laboratory notebooks, in order to log the administration of a specific dose of a specific active ingredient. The voucher sections are usually areas of the overlapping label part. Correspondingly implemented overwrapping labels are described in European Patent No. EP 0 463 193 A1, among others.

In the meantime, overwrapping labels having suspension tabs for infusion bottles to be hung upside down have also appeared on the market. The bow-shaped suspension tabs, which may be pulled out of the film plane of the remaining label glued onto the container, are intended to be hung on the hook of an infusion stand or the like. In labels having suspension tabs, the overwrapping arrangement offers the advantage that the adhesive bond between the container to be suspended and the label is only subjected to thrust loads, but no peeling loads, since the label is glued to itself due to the self-overlapping arrangement. This advantage particularly comes to bear if the container to be suspended is a glass container, since the adhesive bond "plastic on plastic" between the overlapping label areas is more stable than an adhesive bond "plastic on glass". This is even more true if the container surface is slightly contaminated and if the labeled container is tempered in a water bath. Typical contaminants are oil residues, water drops, hand sweat and/or oil, cleaners, and other chemicals. The adhesive force of an adhesive bond on glass is worsened by a water bath treatment, since hydrogen bridge bonds between the silicates of the glass and the carbonyl groups of the adhesive bond break. Tempering in a water bath is common in medical use, and thus labels having suspension tabs must withstand a water bath test in order to ensure functional reliability in use according to DIN 58 376.

The overwrapping labels having a suspension tab on the market are opaque and therefore have the disadvantage that it is hardly possible to observe the fill level. For this reason, a majority of typical labels having suspension tabs are not implemented as self-overlapping and are equipped with especially stable, but also costly, adhesives for this purpose. High failure safety of overwrapping labels is usually not entirely achieved, however. In principle, labels having suspension tabs are known, for example, from German Patent Nos. DE 39 07 862 A1 and DE 91 01 464 U1, as well as European Patent Nos. EP 0 356 574 A2 and EP 0 632 422 A1.

SUMMARY OF THE INVENTION

It is therefore an object of the invention to provide labels having transparent and opaque label areas, which may be manufactured with little complexity.

It is another object of the invention to provide labels having suspension tabs which ensure a stable adhesive bond, even after water bath treatment, and nonetheless allow checking of the fill level of the labeled container. It is yet another object of the present invention to design overwrapping labeled containers having viewing capability so they are cost-effective to implement, particularly containers which may be suspended upside down safely.

These objects are achieved according to the invention by a self adhesive label which has at least one transparent film layer and at least one opaque film layer. The opaque film layer(s) partially covering the transparent film layer(s) on the top and/or bottom, so that at least one transparent label area and at least one opaque label area result.

Complex opaque surface printing, as is currently typical, may be dispensed with. The invention is particularly advantageous in situations where a label also had to be implemented as two-layered or multilayered until now for reasons of stability or function. In this case, according to the present invention, a transparent label window may be implemented with little complexity through only one additional stamping step, slotting, or the like.

The design according to the present invention may implement transparent and opaque label areas in label embodiments having suspension tabs. Thus, with appropriately selected dimensions, overwrapping adhesion is possible and the transparent label area allows the fill level to be checked. The suspension tab may be formed by one or more film layers of the label. A multilayered embodiment offers elevated protection against tearing of the suspension tab.

According to an advantageous embodiment, one or more separable label parts and/or voucher sections may be provided. For this purpose, sections may be separable via perforations or punching, and label parts may be attached via adhesive bonds having reduced adhesive force. According to an advantageous embodiment, separable label parts and/or voucher sections are implemented as opaque and cover the transparent label area when properly positioned. After separation and/or removal, the transparent area is visible. Beforehand, there is light and/or UV protection because of the opaque cover. The opaque label area is preferably printed with text and/or image and/or code information. The transparent label area may also advantageously be printed with a scale which makes it easier to read a fill level to be checked through the transparent area, for example.

The film layers of labels according to the present invention may be manufactured in principle, depending on the application, from the known film materials typical in the field of label technology, such as PET, PVC, or polyolefins. In addition to plastic films, other materials are also usable, and the opaque film layer may thus also be implemented from paper, a nonwoven material, or as a fabric layer, for example. Furthermore, metallic coatings may also be used, depending on the application.

Typical adhesives are also usable for the self-adhesive coating for attaching labels according to the present invention. In principle, these may be selected, depending on the intended application, type of attachment, and load to be expected, from the entire spectrum of adhesives typical for labels, for example, acrylates, rubber adhesives, hot-melt adhesives, post-curable adhesives, etc. This is also true for adhesives for bonding the individual label layers to one another. The individual labels do not necessarily have to be bonded to one another through gluing, but rather may also be bonded in other ways, for example, through hot lamination or welding (laser welding, ultrasonic welding, etc.) or any other type of bonding.

In addition to adhesive coatings over the entire area, partial-area adhesive coatings are also possible.

If desired, labels according to the present invention may also be equipped with security features known per se to increase forgery security, such as holograms, luminescent ink components, microprint, and the like.

According to a further aspect of the present invention, the object is achieved by a preferably transparent or partially transparent container, to which a label of the type described, having a transparent film layer and an opaque film layer which partially covers it, are attached in a self-overlapping way in an overwrapping arrangement. In labels equipped with a suspension tab, the area of the transition between suspension tab and container is preferably positioned below the container center of gravity, so that the container may be suspended upside down on the suspension tab.

If label parts and/or voucher sections separable as described above are provided, these may advantageously be positioned in such a way that the entirety of the separable label parts and/or voucher sections at least predominantly or even completely covers the transparent label area.

In principle, any variation of the present invention described and/or indicated in the scope of the present application may be especially advantageous, depending on the economic and technical conditions in the individual case. If not otherwise noted and/or if technically possible in principle, individual features of the embodiments described are exchangeable or combinable with one another.

BRIEF DESCRIPTION OF THE DRAWINGS

In the following, several preferred embodiments of the present invention will be described in the form of examples with the aid of the associated drawing, which is to be understood as purely schematic. The drawing is not to scale, size ratios are partially shown distorted for reasons of clarity. In particular, layer thicknesses of the individual label layers are shown greatly exaggerated in sectional illustrations. Since the figures of the drawing use different individual features for illustration, which may often be exchanged and/or combined with one another, they have different degrees of detail. Features corresponding to one another are thus each provided with identical reference numbers if advisable.

DETAILED DESCRIPTION OF THE PREFERRED EMBODIMENT

Figure 1:
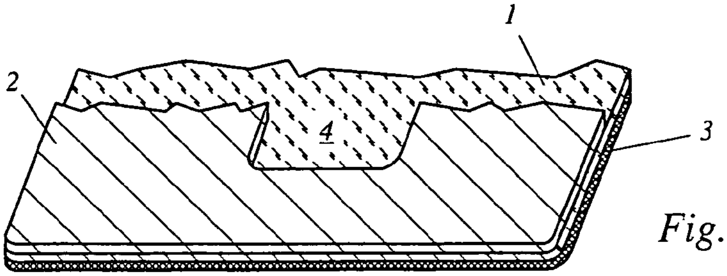
FIG. 1 shows a detail of a label according to one embodiment of the present invention in a perspective view having cuts in the film layers offset to one another.

Referring now in detail to the drawings, the label illustrated in FIG. 1 schematically shows a simple basic form of a label according to the present invention, which essentially comprises a transparent film layer 1 and an opaque film layer 2, having a window 4 in the form of a punched-out opening. On the bottom, the label is provided with a transparent pressure-sensitive adhesive coating 3.

Figure 2A:
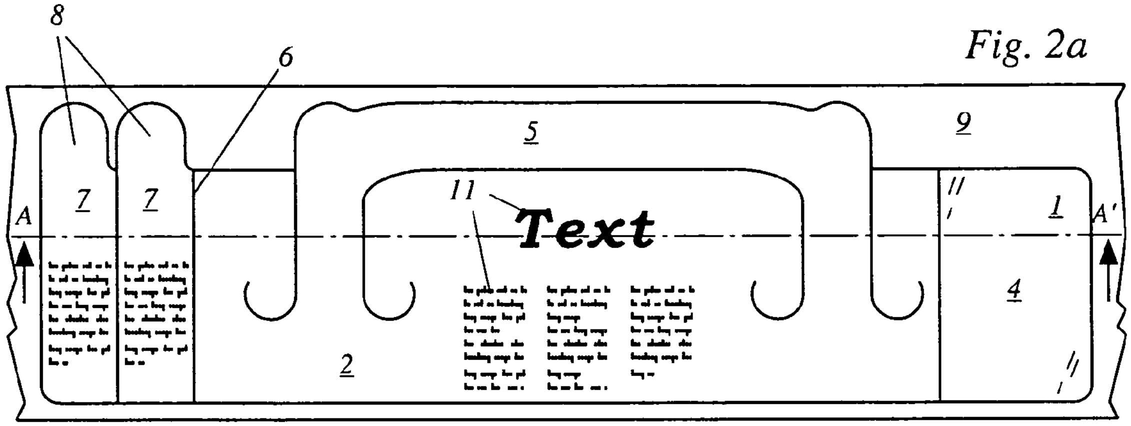
FIG. 2*a* shows a label according to an embodiment of the present invention, positioned on a piece of pull-off material, having suspension tabs and two voucher sections in a top view.
Figure 2B:
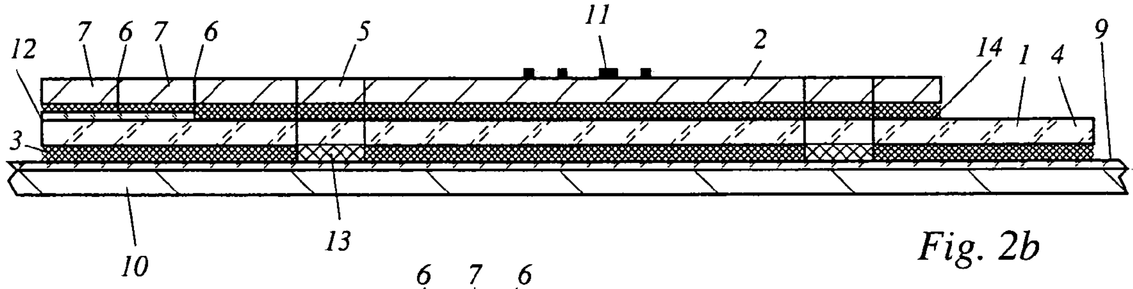
FIG. 2*b* shows a sectional view through the label from FIG. 2*a* in the sectional plane indicated by the dashed line A-A', which is oriented perpendicular to the plane of the drawing.
Figure 2C:
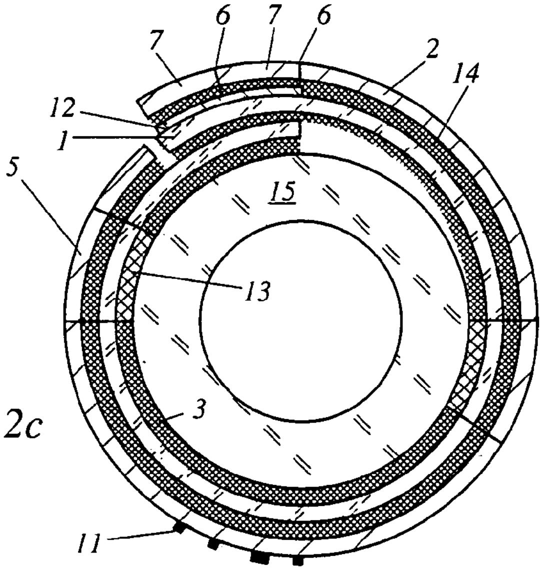
FIG. 2*c* shows a sectional view of a container according to one embodiment of the present invention, whose label is implemented like the label from FIGS. 2*a-b,*

The strip-shaped label shown in FIGS. 2*a* and 2*b* and—in the stuck-on state—FIG. 2*c*, has a transparent plastic film layer 1, which is not, however, completely covered by the opaque film layer 2 over the majority of its length. A window area 4 not covered by the opaque film layer remains, which extends over the entire strip width in order to have free view of the liquid meniscus in the container 15 in the stuck-on state, independently of the container fill level.

Film layers 1, 2 are bonded to one another using an adhesive coating 14. The bottom pressure-sensitive adhesive coating 3 is used for attachment to the container 15. Before attachment, the label is positioned on a carrier 10, made of paper, for example, having an adhesive-repellent surface 9, made of silicone varnish, for example.

A bow-shaped suspension tab 5 is produced through stamping, on whose bottom the pressure-sensitive adhesive coating 3 is deactivated using an adhesive killer, so that there are non-adhesive areas 13 here, which allow the suspension tab 5 be pulled easily out of the label plane to hang of the container 15.

The opaque film layer 2 has an imprint 11.

Two printed voucher sections 7 are implemented through punches 6 in opaque label film 2. Transparent film layer 1 is provided with an adhesive-repellent coating 12, which is also transparent, such as a silicone coating, below the voucher sections 7, through which the voucher sections 7 may be removed easily. The removed voucher sections 7 may be stuck on again through the adhesive coating 14, for example, on a page of a patient file. For easier handling, each of voucher sections 7 has a non-adhesive grip tab 8 on the bottom.

In the stuck-on state, the label area, in which the voucher sections 7 are positioned, overlaps the transparent window area 4. After removal of one of the voucher sections 7, window area 4 is visible. The container contents are visible through window area 4 and the transparent wall of container 15.

FIGS. 3*a* through 10*b* show seven different further embodiments of labels according to the present invention as sectional illustrations., once flat and once in the stuck-on state in an overwrapping arrangement in each case, analogous to FIGS. 2*b* and 2*c*. The containers 15 are only indicated as simple circles in this case. Although not shown, each of the variations illustrated may be designed as a bow label having a suspension tab similar to FIGS. 2*a-c*. Furthermore, additional equipped features such as imprints and the like may be provided.

All variations illustrated have an opaque film layer 2 and a non-congruent transparent film layer 1 according to the present invention. The film layers are bonded to one another via an adhesive coating 14. A pressure-sensitive adhesive coating 3 is used for the gluing to the container 15. Some variations are equipped with an adhesion-reducing coating 16 over part of the area for reasons of manufacturing technology, which is used for matrix removal.

Figure 3A:
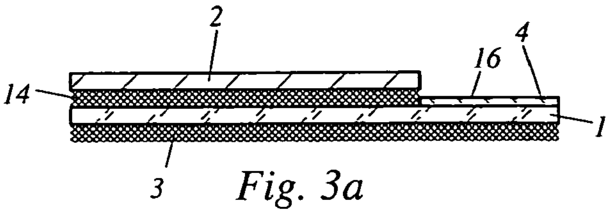
FIG. 3*a* shows a sectional view of a label according to one embodiment of the present invention for overwrapping attachment.
Figure 3B:
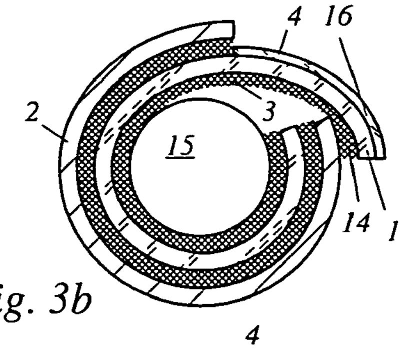
FIG. 3*b* shows a sectional view of a container according to one embodiment of the present invention, whose label is implemented like the label from FIG. 3*a*, the container wall only being indicated as a simple circle.

In FIGS. 3*a-b*, the opaque film layer 2 is positioned over the transparent film layer 1. Because of the smaller area dimensions of the opaque film layer, a transparent area 4 results, of which a part remains exposed in the stuck-on state.

Figure 4A:
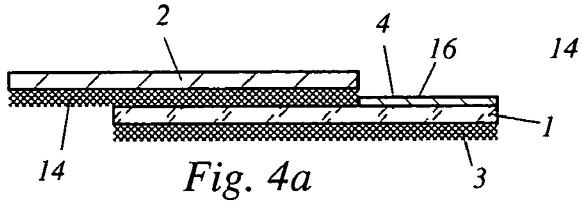
FIG. 4*a* shows a sectional view of a label according to one embodiment of the present invention for overwrapping attachment, opaque and transparent layers being offset to one another.
Figure 4B:
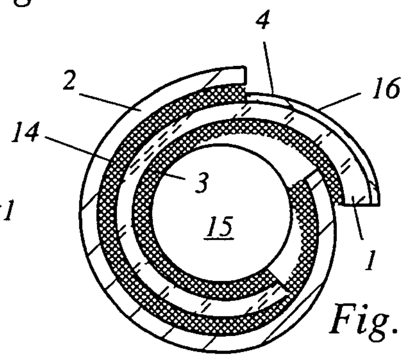
FIG. 4*b* shows a sectional view of one embodiment of a container according to the present invention, whose label is implemented like the label from FIG. 4*a*, the container wall only being indicated as a simple circle.

The arrangement in FIGS. 4*a-b* is implemented similarly as in FIGS. 3*a-b*, but the film layers 1, 2 have approximately the same dimensions, though they are positioned offset to one another. In the stuck-on state, the overlap is small enough to leave a transparent area 4 free.

Figure 5A:
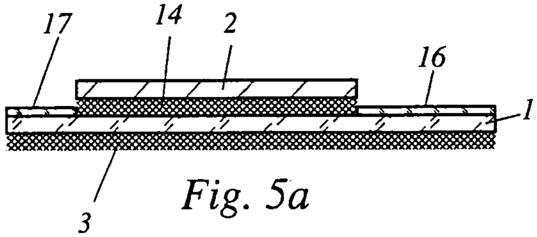
FIG. 5*a* shows a sectional view of a label according to one embodiment of the present invention for overwrapping attachment.
Figure 5B:
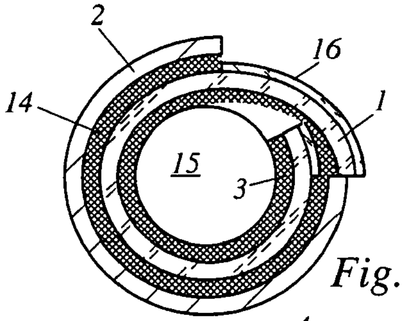
FIG. 5*b* shows a sectional view of a container according to one embodiment of the present invention, whose label is implemented like the label from FIG. 5*a*, the container wall only being indicated as a simple circle.

The arrangement in FIGS. 5*a-b* is also implemented similarly as in FIGS. 3*a-b*, but an additional adhesion-reducing coated film area 17 is provided here in the area of the overlap, which makes it easier to remove the label from the container 15.

Figure 6A:
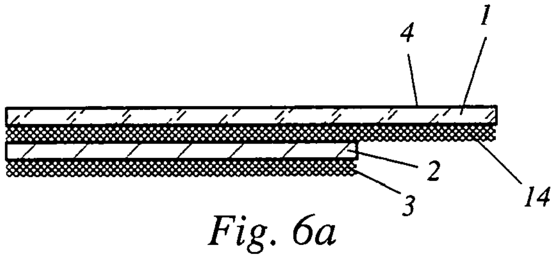
FIG. 6*a* shows a sectional view of a label according to one embodiment of the present invention for overwrapping attachment.
Figure 6B:
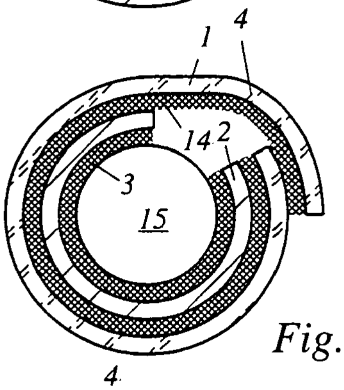
FIG. 6*b* shows a sectional view of a container according to one embodiment of the present invention, whose label is implemented like the label from FIG. 6*a*, the container wall only being indicated as a simple circle.
Figure 7A:
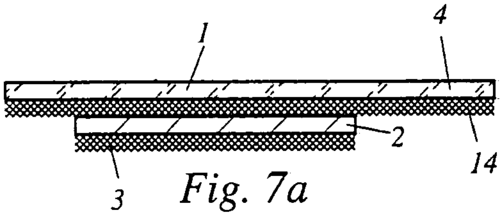
FIG. 7*a* shows a sectional view of a label according to one embodiment of the present invention for overwrapping attachment.
Figure 7B:
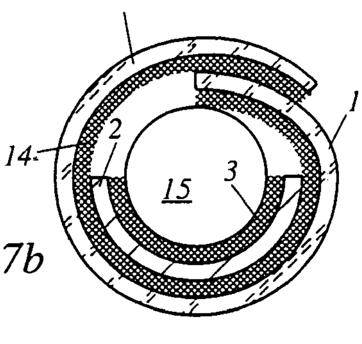
FIG. 7*b* shows a sectional view of a container according to one embodiment of the present invention, whose label is implemented like the label from FIG. 7*a*, the container wall only being indicated as a simple circle.

In the arrangement from FIGS. 6*a-b*, the transparent film layer 1 is positioned over the opaque film layer 2 and projects beyond the latter on one side. Printing may alternately be provided both on the transparent film layer 1 and on the opaque film layer 2. If the opaque film layer 1 is printed, the imprint is protected from external influences by the transparent film layer 1. This is also true for security features or the like positioned on the opaque film layer. The arrangement in FIGS. 7*a-b* is implemented similarly as in FIGS. 6*a-b*, but the transparent film layer 1 projects beyond the opaque film layer on two sides.

Figure 8A:
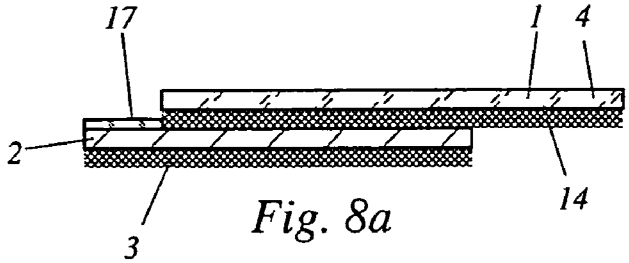
FIG. 8*a* shows a sectional view of a label according to one embodiment of the present invention for overwrapping attachment.
Figure 8B:
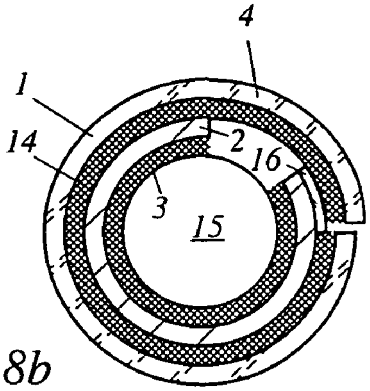
FIG. 8*b* shows a sectional view of a container according to one embodiment of the present invention, whose label is implemented like the label from FIG. 8*a*, the container wall only being indicated as a simple circle.
Figure 9A:
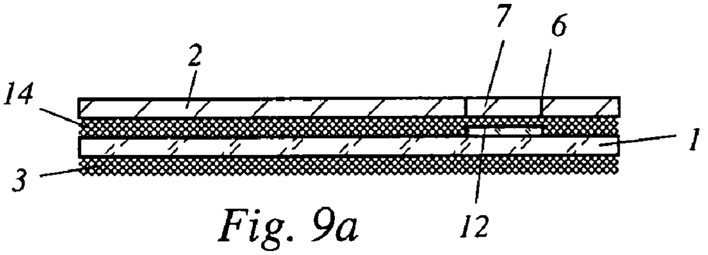
FIG. 9*a* shows a sectional view of a label according to one embodiment of the present invention for overwrapping attachment.
Figure 9B:
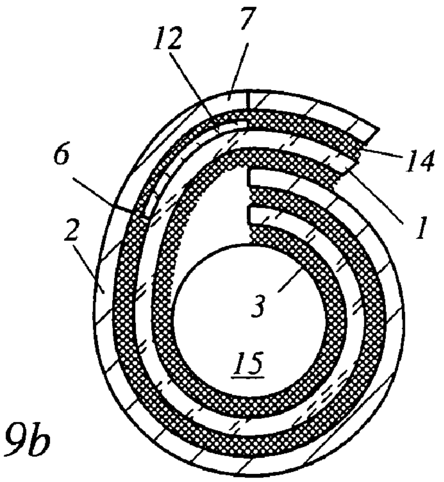
FIG. 9*b* shows a sectional view of a container according to one embodiment of the present invention, whose label is implemented like the label from FIG. 9*a*, the container wall only being indicated as a simple circle.

The arrangement in FIGS. 8*a-b* is again implemented similarly as in the arrangement from FIGS. 6*a-b*, but, as in FIGS. 5*a-b*, an adhesion-reducing coated film area 17 is provided in the area of the overlap.

Figure 10A:
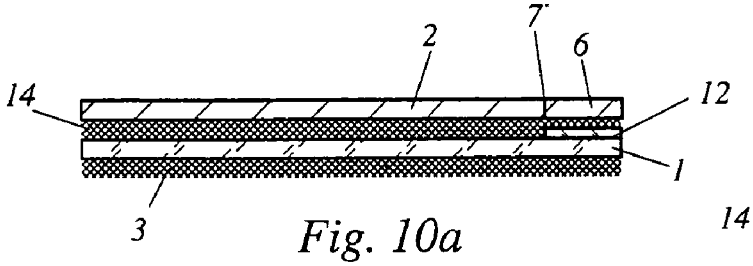
FIG. 10*a* shows a sectional view of a label according to one embodiment of the present invention for overwrapping attachment.
Figure 10B:
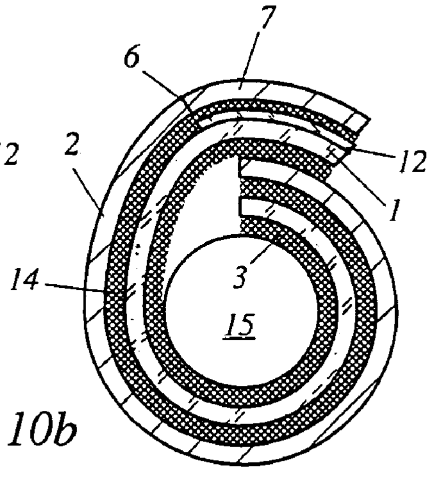
FIG. 10*b* shows a sectional view of a container according to one embodiment of the present invention, whose label is implemented like the label from FIG. 10*a*, the container wall only being indicated as a simple circle.

FIGS. 9*a*, 9*b*, 10*a*, and 10*b* show labels similar to FIGS. 2*a*, 2*b*, 2*c*, but each only having one voucher section 7. While this section is at a distance from the edge in FIGS. 9*a*-9*b*, the voucher section in FIGS. 10*a*, 10*b* is flush with the edge. Furthermore, in contrast to FIGS. 2*a*, 2*b*, 2*c*, transparent film layer 1 and opaque film layer 2 are initially implemented as congruent. A transparent area only results when the voucher section 7 is removed, because this section is entirely or partially positioned outside the overlapping area.

Accordingly, while only a few embodiments of the present invention have been shown and described, it is obvious that many changes and modifications may be made thereunto without departing from the spirit and scope of the invention.

What is claimed is:

1. A container having a label stuck on in a self-overlapping way in an overwrapping arrangement on the container, the label comprising:

at least one transparent film layer;

at least one opaque film layer partially covering the transparent film on at least one of a top and bottom of the transparent film layer, said at least one opaque film layer having two ends in a circumferential direction, and an adhesive layer that establishes a connection between said opaque film layer and said transparent film layer;

so that the label comprises at least one transparent label area and at least one opaque label area, wherein both ends of said at least one opaque film layer overlap with said at least one transparent film layer and with said adhesive layer.

2. The container according to claim 1, wherein an area of a transition between the suspension tab and the container is positioned below a center of gravity of the container, so that the container may be hung upside down on the suspension tab.

3. The container according to claim 1, wherein at least one of the opaque film layers is continuously coherent.

4. The container according to claim 1, wherein the label has a suspension tab.

5. The container according to claim 4, wherein the suspension tab of the label is produced from one of the film layers.

6. The container according to claim 1, wherein the label has at least one removable voucher section.

7. The container according to claim 6, wherein the voucher section is opaque, and the entire voucher section covers at least a majority of the transparent label area.

* * * * *